3,114,775
PROCESS FOR THE OXIDATION OF
ORGANIC SULFIDES
Lawrence J. Hughes, Hitchcock, and Talmage D. McMinn, Jr., and James C. Burleson, Texas City, Tex., assignors to Monsanto Chemical Company, St. Louis, Mo., a corporation of Delaware
No Drawing. Filed Oct. 23, 1961, Ser. No. 147,095
6 Claims. (Cl. 260—607)

The present invention relates to a process for the oxidation of organic sulfides. More particularly, it relates to a process for the oxidation of organic sulfides in the liquid phase to the corresponding sulfoxides and/or sulfones employing ozone as the oxidant.

Various methods have been employed in the past to oxidize organic sulfides to sulfoxides and/or sulfones using such oxidizing agents as peroxides, persalts and peracids as well as oxygen and ozone. In the practice of the prior art where ozone has been employed as the oxidant, the reaction has usually been effected at low temperatures, i.e., from about 0° to about —30° C., and in an inert solvent which serves as the reaction medium. While this method is satisfactory in certain respects, it has several drawbacks from the standpoint of commercial exploitation. Facilities required for maintaining the low temperatures together with the relatively large size or number of reaction vessels necessitated by the use of a solvent medium for the reaction result in high capital expense for process equipment. The slow reaction rate at low temperatures results in lengthy reaction periods. Also, the recovery of the product from the solvent medium requires special operations which are time-consuming and frequently give rise to difficulties.

It is, therefore, an object of the present invention to provide an improved process for oxidizing organic sulfides to the corresponding sulfoxides and/or sulfones with ozone.

It is a further object of the invention to provide an improved method for the manufacture of organic sulfoxides and/or sulfones from the corresponding organic sulfides by an oxidation process using ozone as the oxidizing agent which is commercially attractive by virtue of its economy, ease of operation, and efficiency.

Other objects and advantages of the present invention will become apparent to those skilled in the art from the following detailed description thereof.

According to the invention, organic sulfoxides and/or sulfones are produced by oxidizing an organic sulfide in the liquid phase with ozone at temperatures within the range from about 60° to about 150° C. The sulfides which are used as starting materials in the process are those corresponding to the general formula

wherein each R is the same or different and is chosen from the group consisting of alkyl radicals containing from 4 to 12 carbon atoms, hydroxyalkyl radicals containing from 2 to 12 carbon atoms, aryl radicals containing from 6 to 12 carbon atoms and aralkyl radicals containing from 7 to 13 carbon atoms. Examples of such compounds include di-n-butyl sulfide, di-n-pentyl sulfide, diisohexyl sulfide, butyl hexyl sulfide, di-n-octyl sulfide, di-n-decyl sulfide, di-n-dodecyl sulfide, n-butyl n-dodecyl sulfide, bis β-hydroxypropyl sulfide, n-butyl β-hydroxyethyl sulfide, bis β-hydroxybutyl sulfide, bis γ-hydroxyhexyl sulfide, n-hexyl γ-hydroxybutyl sulfide, diphenyl sulfide, butyl phenyl sulfide, dodecyl o-tolyl sulfide, dixylyl sulfide, dibenzyl sulfide, tert-octyl benzyl sulfide, β-hydroxyethyl phenyl sulfide, tert-octyl p-tolyl sulfide, bis phenylethyl sulfide, β-hydroxy-n-butyl phenyl sulfide, tert-dodecyl γ-phenylbutyl sulfide, isooctyl phenylethyl sulfide, and the like.

In the process of the invention, the sulfide is employed in the liquid state and the ozone is intimately contacted with it by bubbling it therethrough, for example. In the preferred embodiment, the oxidation is conducted in a reaction column which may suitably be packed with a filling material such as Raschig rings, glass helices or the like to provide increased surface area. The liquid sulfide is introduced near the top of the column while the ozone is introduced through a glass frit at the bottom and bubbled up through the liquid. For practical operation, a disengaging section is provided near the top of the reaction column for controlling the circulation of the ozone. This operation can be carried out in either a batch-wise or a continuous manner.

The temperature at which the oxidation is conducted will vary depending upon the product desired. Generally, the sulfide is converted to the sulfoxide at temperatures within the range from about 60° to about 110° C. Preferred temperatures for producing the sulfoxide lie between about 90° and 100° C. Complete oxidation to the sulfone requires somewhat higher temperatures. The sulfone begins to predominate in the oxidation product at about 115° C., and yields increase from this temperature up to a temperature of about 150° C. Preferably, the temperature is maintained at from about 125° to about 135° C. to obtain maximum yields of the sulfone.

Likewise, the ratio of ozone to the sulfide being oxidized may be varied depending upon the desired oxidation product. In the production of sulfoxides from the sulfides, stoichiometric quantities of the reactants as represented by the equation

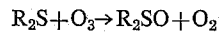

can be used. However, for best results, an excess of ozone over the stoichiometric quantity required for the reaction is usually employed. Suitable mole ratios of ozone to sulfide are those in the range from 1:1 to 1.5:1 with those in the range from 1.05:1 to 1.1:1 preferred. In the production of the sulfones, stoichiometric quantities of the reactants as represented by the equation

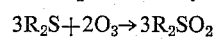

can be employed also but these tend to give a discolored product. Therefore, the ozone is usually employed in excess for this reaction as well. Mole ratios of ozone to sulfide of 0.67:1 to 1.6:1 are generally suitable while those in the range from about 0.9:1 to 1.2:1 are preferred.

Contact times anywhere from about 4 to about 10 minutes give generally satisfactory yields of either oxidation product.

Recovery of the sulfoxide or the sulfone is readily effected by known techniques. The liquid reaction product is simply cooled to bring about crystallization and any further purification required can be accomplished by recrystallization from any solvent for the product such as acetone, isopropanol, ether, etc.

The invention is illustrated in the following examples which, however, are not to be construed as limiting it in any manner whatsoever.

*Example 1*

Approximately 2.0 g. (16.7 millimoles) of bis β-hydroxyethyl sulfide was charged to a jacketed tubular reactor about 15 mm. in diameter fitted with a glass frit at the bottom and having a disengaging section of increased diameter above the liquid level. Ozone from an ozone generator was introduced through the glass frit and bubbled up through the liquid sulfide maintained at a temperature of about 100° C. by passing steam continuously through the outside jacket. Off-gas from the reactor was passed through an iodine scrubber. At the end of the 40-min. reaction period, titration of the contents of the scrubber with standard sodium thiosulfate established that approximately 1.5 moles of ozone had been fed per mole of sulfide. Analyses of the product by means of an infrared spectrophotometer showed it to be about a 50–50 mixture of bis β-hydroxyethyl sulfoxide and bis β-hydroxyethyl sulfone. The product had a crystallizing point of 90.5° C.

*Example 2*

The experiment of Example 1 was repeated except that the temperature of the reaction in this instance was maintained at about 130° C. by passing vapors from refluxing xylene through the reactor jacket. Approximately 1.4 moles of ozone were fed per mole of sulfide charged over a 45-min. reaction period. Infrared analysis established that the liquid product consisted predominantly of bis β-hydroxyethyl sulfone with very little of the corresponding sulfoxide present and a trace of a carbonyl compound.

*Example 3*

In the manner of the two foregoing examples, bis β-hydroxyethyl sulfide and ozone in a mole ratio of 1:1.6 were reacted at a temperature of about 150° C. maintained by passing the hot vapors of refluxing cumene through the reactor jacket. The product as analyzed by means of its infrared spectra was essentially all bis β-hydroxyethyl sulfone with a minor amount of a carbonyl impurity present.

*Example 4*

In this run, a "trickle bed" reactor was employed. It consisted of a microburette calibrated in 0.01-cc. divisions and provided with an off-gas vent. The burette was attached to a jacketed 15-mm. column provided with gas inlet means. A reservoir for collection of products was connected at the base of the column. The column was packed to a depth of about 2¾ in. with ⅛-in. glass helices to provide increased surface area. Bis β-hydroxyethyl sulfide was allowed to drop onto the packing while a stream of ozonized oxygen was passed up through it. The temperature in the reactor bed was controlled at 130° C. by allowing boiling xylene vapors to pass through the outer jacket. The off-gas from the top of the reactor was passed through an iodine scrubber and the resulting solution was titrated with a standard sodium thiosulfate solution to establish the molar amount of ozone fed to the reaction. The mole ratio of sulfide to ozone over the 2-hr. reaction period was approximately 1:1. At the end of the reaction period, the column packing was rinsed with 20 cc. of water and these rinsings were combined with the product collected in the reservoir of the column. The resulting mixture was dried in a rotary film evaporator and analyzed by means of an infrared spectrophotometer. The infrared spectrum showed it to be mostly bis β-hydroxyethyl sulfone containing a trace of a carbonyl compound. The yield of sulfone based on ozone consumed was calculated to be about 50.8%.

*Example 5*

Using the same apparatus and following the same procedure as in Example 4, bis β-hydroxyethyl sulfide was oxidized with ozone using a mole ratio of ozone to sulfide of 1.2:1. The product recovered in 73.8% yield based on ozone consumed and identified by means of its infrared spectrum was essentially all bis β-hydroxyethyl sulfone and contained none of the corresponding sulfoxide nor any carbonyl impurity.

*Example 6*

Using the apparatus and procedure of Example 4, di-n-hexyl sulfide is reacted with ozone at a temperature of about 90° C. while employing a mole ratio of ozone to sulfide of 1.2:1. Di-n-hexyl sulfoxide is recovered in good yield together with a minor amount of di-n-hexyl sulfone.

*Example 7*

Diphenyl sulfoxide containing a small amount of diphenyl sulfone is produced by reacting diphenyl sulfide with ozone in the "trickle bed" reactor of Example 4 at a temperature of 100° C. using a mole ratio of ozone to diphenyl sulfide of 1.2:1 and recovering the product in the manner described in that example.

What is claimed is:

1. A process for oxidizing organic sulfides of the formula

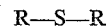

R—S—R wherein R is chosen from the group consisting of alkyl radicals containing from 4 to 12 carbon atoms, hydroxyalkyl radicals containing from 2 to 12 carbon atoms, aryl radicals containing from 6 to 12 carbon atoms, and aralkyl radicals containing from 7 to 13 carbon atoms which comprises contacting the liquid sulfide with a stream of ozone at a temperature in the range from about 60° to about 150° C.

2. A process for the manufacture of organic sulfoxides which comprises contacting a liquid organic sulfide of the formula

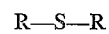

R—S—R wherein R is chosen from the group consisting of alkyl radicals containing from 4 to 12 carbon atoms, hydroxyalkyl radicals containing from 2 to 12 carbon atoms, aryl radicals containing from 6 to 12 carbon atoms, and aralkyl radicals containing from 7 to 13 carbon atoms with a stream of ozone at a temperature in the range from about 60° to about 110° C. while maintaining the mole ratio of ozone to sulfide in the range from about 1:1 to about 1.5:1.

3. A process for the manufacture of organic sulfones which comprises contacting a liquid organic sulfide of the formula

R—S—R wherein R is chosen from the group consisting of alkyl radicals containing from 4 to 12 carbon atoms, hydroxyalkyl radicals containing from 2 to 12 carbon atoms, aryl radicals containing from 6 to 12 carbon atoms, and aralkyl radicals containing from 7 to 13 carbon atoms with a stream of ozone at a temperature in the range from about 115° to about 150° C. while maintaining the mole ratio of ozone to sulfide in the range from about 0.67:1 to 1.6:1.

4. A process for the oxidation of bis β-hydroxyethyl sulfone which comprises contacting liquid bis β-hydroxyethyl sulfide with a stream of ozone at a temperature in the range from about 60° to about 150° C.

5. A process for the manufacture of bis β-hydroxyethyl sulfoxide which comprises contacting liquid bis β-hydroxyethyl sulfide with a stream of ozone at a temperature within the range from about 90° to about 100° C. while maintaining the mole ratio of ozone to sulfide in the range from about 1.05:1 to 1.1:1.

6. A process for the manufacture of bis β-hydroxyethyl sulfide which comprises contacting liquid bis β-hydroxyethyl sulfide with a stream of ozone at a temperature within the range from about 125° to about 135° C. while maintaining the mole ratio of ozone to sulfide in the range from about 0.9:1 to 1.2:1.

References Cited in the file of this patent

Barnard: J. Chem. Soc. (London), 1957, 4547–4555.
Horner et al.: Chem. Ber. 91, 75–81 (1958).

UNITED STATES PATENT OFFICE
CERTIFICATE OF CORRECTION

Patent No. 3,114,775 December 17, 1963

Lawrence J. Hughes et al.

It is hereby certified that error appears in the above numbered patent requiring correction and that the said Letters Patent should read as corrected below.

Column 4, line 53, for "sulfone" read -- sulfide --; line 63, for "sulfide" read -- sulfone --.

Signed and sealed this 9th day of June 1964.

(SEAL)
Attest:

ERNEST W. SWIDER
Attesting Officer

EDWARD J. BRENNER
Commissioner of Patents